Figure 1:
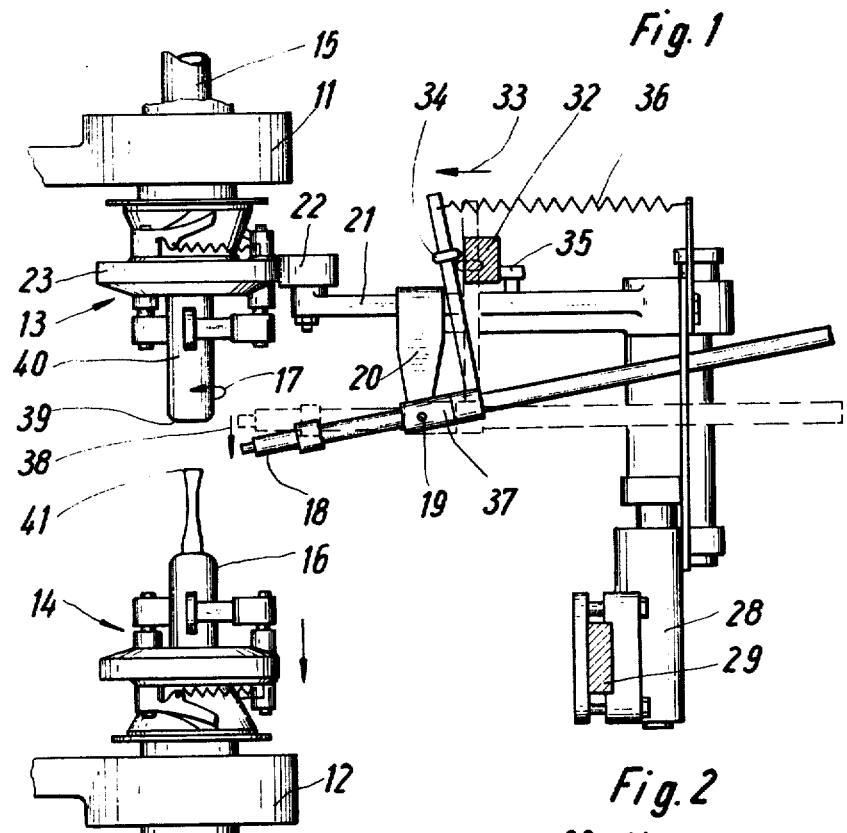

United States Patent [19]
Dichter

[11] 3,874,867
[45] Apr. 1, 1975

[54] APPARATUS FOR PRODUCING VIALS

[76] Inventor: Hans-Joachim Dichter, Sachsendamm 93, 1 Berlin 62, Germany

[22] Filed: July 6, 1973

[21] Appl. No.: 377,132

[30] Foreign Application Priority Data
July 7, 1972  Germany............................ 2234063

[52] U.S. Cl. ..................... 65/271, 65/272, 65/280
[51] Int. Cl. ........................................... C03b 23/04
[58] Field of Search ............. 65/270, 271, 272, 278, 65/280, 105, 108

[56] References Cited
UNITED STATES PATENTS

| | | | |
|---|---|---|---|
| 1,577,543 | 3/1926 | Schrader ........................... | 65/271 X |
| 1,962,985 | 6/1934 | Dichter ............................. | 65/271 |
| 2,258,408 | 10/1941 | Cozzoli ............................. | 65/271 |
| 3,462,255 | 8/1969 | Couquelet ......................... | 65/271 X |

*Primary Examiner*—Robert L. Lindsay, Jr.
*Attorney, Agent, or Firm*—Smythe & Moore

[57] ABSTRACT

The invention relates to a machine for the production of glass vials from glass tubes which includes pairs of coaxial chucks rotating about their own axes. The chucks travel past a plurality of working stations in which glass tube sections are held between two chucks are softened by a burner and divided into two parts with the simultaneous formation of at least one vial bottom. The chuck holding the separated part withdraws from the other chuck thereby incresing the distance between the end of the part which it holds, and the burner. The distance between the burner and the end forming a closed bottom on the second part of the tube section held by the other chuck is also increased during the dividing operation.

5 Claims, 4 Drawing Figures

APPARATUS FOR PRODUCING VIALS

The invention relates to a machine for the production of glass vials, particularly ampoules, from glass tube, comprising pairs of coaxial chucks rotating about their own axes and travelling past a plurality of working stations. Glass tube sections held between two chucks are softened by a burner and divided into two parts with the simultaneous formation of at least one vial bottom. The chuck holding the separated part then withdraws from the other chuck thereby increasing the distance between the end of the part it holds and the burner.

Machines of this kind are known in the art and are used for the production of single or double ampoules, in which during the process of separation the burner is guided in a plane which is at a constant distance from the chuck which holds that part of the tube section which remains attached to the original glass tube. This is an arrangement which results in the end of the tube section held by said chuck being more intensely heated than the end of the tube section held by the other chuck because the latter is removed from the burner flame by the withdrawing chuck.

Since enough heat must always be produced by the burner to soften the portion of tube the burner is intended to sever, the closed bottom which is not removed from the range of the flame is necessarily overheated.

It has been ascertained when working with different types of glass that over-heating is extremely undesirable. It has been found that undue heating of the glass during the forming of ampoule bottoms causes the glass to evolve substances which are deposited inside the ampoules and later dissolve in the ampoule contents.

Primarily these substances are soda and boric acid. The evolution of these substances is probably due to the vapour pressure of the most volatile constituents of the glass tube being considerably increased by the high temperatures so that they evaporate to be at once deposited above the bottom on the inside of the ampoule where the temperatures are not as high in the form of a more or less wide ring. It will be apparent that contamination of the contents of the filled ampoule by these deposits is most undesirable.

Although in principle the deposition of substances evolved by the glass can be controlled by lowering the working temperatures, the drawback of the two ends of the divided tube section being differentially heated remains.

It is therefore an object of the present invention to provide a machine of the above specified kind, in which the facing ends of the two severed parts, when a tube section is divided, are more evenly heated, and any temperature difference are far less pronounced than in conventional machines.

Broadly stated, according to the invention this is achieved by also progressively increasing the distance between the burner and the closed bottom end of the second part of the tube section held by the other chuck during the dividing operation.

The invention offers the advantage that the softened zones of the portions that are separated by the flame of the burner are both withdrawn out of range of the burner.

The result is not only a more uniform distribution of heat between the two parts, but also the creation of the possibility of so adjusting the relative motions of the burner and of the two chucks that any undesirable overheating of the softened zones is avoided, even when using a very hot flame. The volatilisation of noxious substances from the glass can thus be prevented without undue expense or, at least, any such effects can be minimised.

If machines equipped with vertically aligned pairs of chucks are intended to produce individual ampoules and the points of severance are the ends of the elongated ampoule neck adjacent the bottom of the next ampoule, conventional machines in which only the chuck holding the finished, or nearly finished, ampoule performs a so-called drawing motion. In this a filament is drawn which collapses from the point of severance and gives rise to a jagged termination of the ampoule neck.

In one proposed machine according to the invention, the formation of this filament is also suppressed, and with particularly good effect, if the burner is attached to a swivel arm which is mounted to swivel about a swivel axis on the machine frame parallel to the axis of the glass tubes, and a hinge which is substantially normal to the swivel axis of the swivel arm is mounted on the swivel arm to permit the burner to be tilted about said hinge.

In such an arrangement the flame can follow the molten filament and by overheating burn and evaporate the same, without in any way injuring the ampoule itself.

Figure 2:
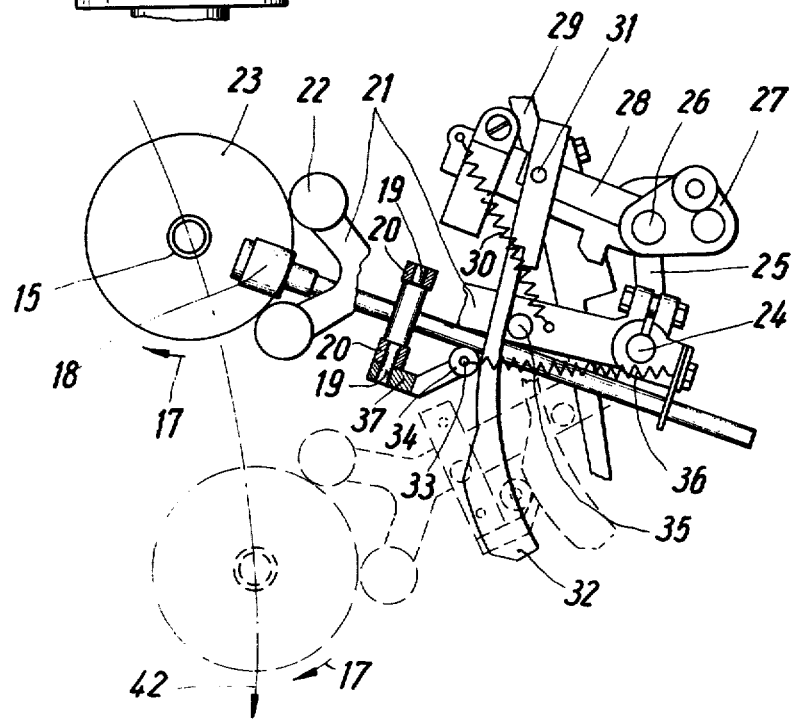
Figure 3:
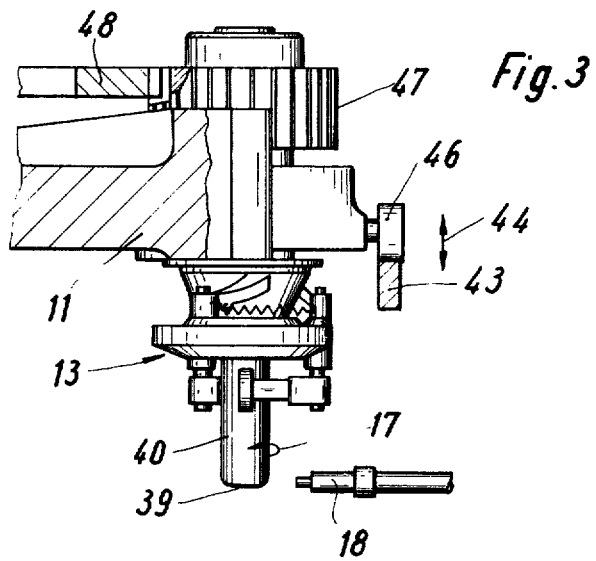
Figure 4:
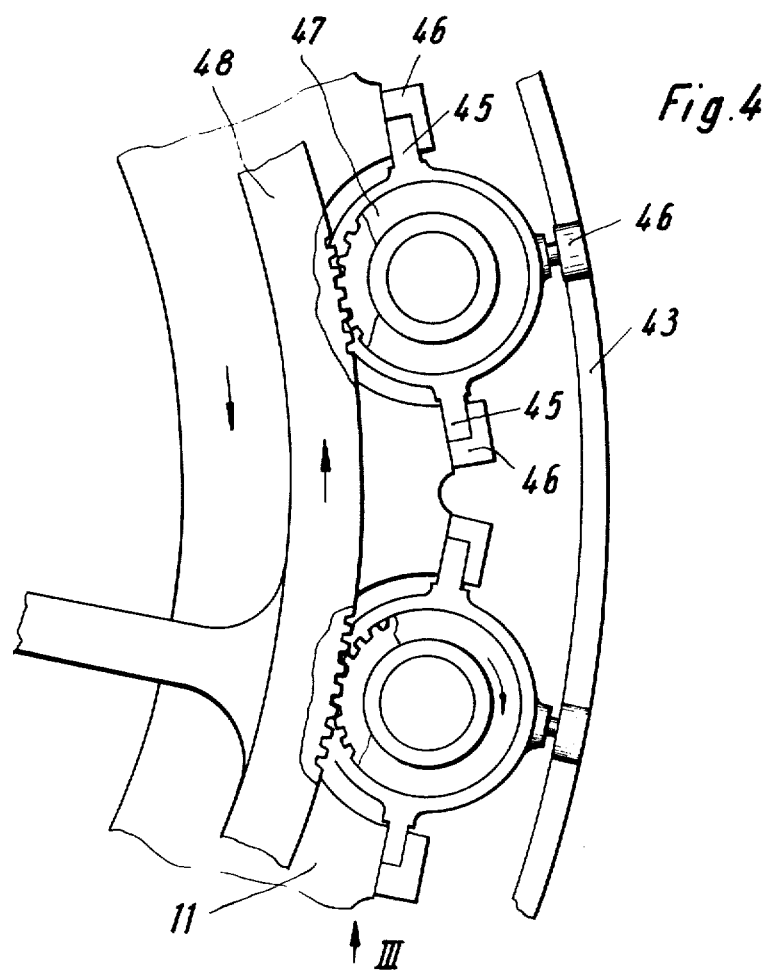

The invention will be hereinafter more particularly described by way of example, with reference to one embodiment shown in the accompanying drawing in which:

FIG. 1 is a side elevation of two vertically aligned chucks and an associated burner in a machine according to the invention, FIG. 2 is a part sectional view from above of the arrangement according to FIG. 1, FIG. 3 is a side elevation of an upper chuck in a machine of modified construction and FIG. 4 is a view from above of the arrangement in FIG. 3.

In FIG. 1 there are provided an upper and a lower ring of holders for a plurality of upper and lower chucks 13, 14 of conventional construction which needs no further description. The upper chucks 13 grips a glass tube 15 from which a portion 16 forming an ampoule has been severed.

For softening the glass tube at the point where severance takes place a burner 18 is provided. This is hingeably mounted on a hinge pin 19 in a bracket 20 attached to a swivel arm 21. The arm 21 carries rollers 22 which bear against a supporting ring 23 on the upper chuck 13. The rollers 22 and the supporting ring 23 guide the swivel arm and hence the burner, whilst the glass tube 15 is carried from the upper position into the lower position in FIG. 2.

The end of the swivel arm 21 remote from the rollers 22 is mounted on a swivel pin 24 on an arm 25 which is itself deflectable about a pin 26 on an elevationally adjustable holder 27. The holder 27 is attached to a carrier 28 supported by a rail 29 in the machine frame. A spring 30 keeps the rollers 22 of the swivel arm 21 in contact with the supporting ring 23.

The carrier 28 mounts a cam 32 which is deflectable about a pin 31. This cam is urged by a spring-loaded roller 34, 36 on a control arm 33 against a supporting roller 35 on the swivel arm 21. The control arm 33 is attached to a fitting 37 which is fast on the hinge pin 19. Movements of the fitting 37 are thus transmitted by the hinge pin 19 to the burner 18.

When the burner 18 and the swivel arm 21 are in the upper position in FIG. 2 the burner will be in the position indicated in dashed lines in FIG. 1. When the swivel arm 21 has reached the lower position shown in dashed lines in FIG. 2 then it will be in full line position in FIG. 1 in which the lower chuck 14 carrying part 16 has descended as shown. In other words, the burner performs a nodding motion in the direction indicated by an arrow 38 whilst the swivel arm 21 follows the movement of the upper chuck 13. The burner axis thus tilts out of a plane containing the bottom 39 of part 40 of the glass tube 15 and follows the descending end 41 of part 16 of the tube 15 forming the completed ampoule. In FIG. 1 the lower chuck 14 has nearly reached its bottom end position. In the course of the further movement of the chucks in the direction of arrow 42 in FIG. 2 contact between the supporting ring 23 and the rollers 22 is lost and spring 30 restores the swivel arm 21 into its starting position. At the same time the burner 18 also returns into its starting position and a fresh working cycle can begin as the rollers 22 make contact with the supporting ring 23 on the next upper chuck 13 which moves into range.

Whereas in the embodiment according to FIGS. 1 and 2, the burner 18 is hingeably lowered away from the bottom 39 of part 40 of the tube section that is the next to be shaped, the burner in the embodiment according to FIGS. 3 and 4 is fixed. In this arrangement a cam 43 bodily raises and lowers the upper chuck 13, as indicated by an arrow 44. For this purpose the chuck is provided with fins 45 sliding in ways 46. The up and down movements are imparted to the upper chuck 13 by a cam follower roller 46. In order to permit rotation to be imparted to the chuck notwithstanding its vertical movements, the chuck is provided with a wide gear ring 47 which meshes with a narrower gear ring 48. In this embodiment the burner is likewise carried by a swivel arm which corresponds in construction to that of the swivel arm 21 in FIGS. 1 and 2. When the bottom 39 of part 40 has softened, the cam 43 lifts the follower roller 46 and thus raises the upper chuck 13 in the drawing of FIG. 3. Consequently the bottom 39 is withdrawn from the flame of the burner 18, as in the previous embodiment, and overheating of the bottom is avoided.

Instead of a cam some alternative control means could be used. For instance the use of conventional control means which are operated pneumatically, hydraulically or electrically might also be used.

I claim:

1. A machine for producing glass vials from glass tubes comprising rotatable support means including upper and lower radially extending arms having aligned coaxial pairs of upper and lower chucks arranged on the outer ends thereof, said support means and chucks being rotatable past a plurality of work performing stations, glass tubes extending vertically between and being engageable by said upper and lower chucks, and said chucks being vertically movable for forming vials from said tubes, burner means including a rod arranged on said machine and extending generally at right angles to and intermediate said upper and lower chucks, and means for moving said chucks relatively to draw said tubes and whereby heat from said burner rod means is uniformly applied to said tubes to permit softening thereof and separation into vials having closed bottoms and neck portions.

2. A machine for producing glass vials according to claim 1 wherein said burner rod means is mounted pivotally on said machine, and means associated with said burner rod means for swiveling said rod means so that rod means and heat therefrom is uniformly applied to said tubes during drawing and separation into vials.

3. A machine for producing glass vials according to claim 2 wherein said burner rod means is pivotally mounted on bracket means and is movable in a plane normal to the axis of said tubes, and cam means is associated with said bracket means for pivoting said burner rod means out of a plane parallel to said normal plane.

4. A machine for producing glass vials according to claim 3 wherein actuating rod means is attached to said burner rod means and is formed with roller means and cam means engageable with said roller means for deflecting said burner rod means as said tubes are formed into vials and whereby heat therefrom is applied uniformly thereto.

5. A machine for producing glass vials according to claim 1, wherein said upper chucks are arranged for vertical movements relative to said burner rod means, and said burner rod means is fixed with respect to said chucks.

* * * * *